United States Patent [19]

Cires

[11] Patent Number: 5,080,284
[45] Date of Patent: Jan. 14, 1992

[54] COOLING SYSTEM FOR THE TRAILING EDGE OF A LINER

[75] Inventor: Alfredo Cires, Palm Beach Gardens, Fla.

[73] Assignee: United Technologies Corporation, Hartford, Conn.

[21] Appl. No.: 543,000

[22] Filed: Jun. 25, 1990

[51] Int. Cl.$^5$ .............................................. F02K 1/38
[52] U.S. Cl. .................................. 239/127.3; 60/271; 60/266
[58] Field of Search ...................... 239/127.1, 127.3; 60/262, 265, 266, 271, 752, 760

[56] References Cited

U.S. PATENT DOCUMENTS

| | | | |
|---|---|---|---|
| 3,605,412 | 7/1968 | Stockel | 239/127.3 |
| 3,972,475 | 8/1976 | Nelson et al. | 239/127.3 |
| 3,979,065 | 9/1976 | Madden | 239/127.3 |
| 4,081,137 | 3/1978 | Sutton et al. | 239/127.3 |
| 4,718,230 | 1/1988 | Honeycutt, Jr. et al. | 239/127.3 |
| 4,747,542 | 5/1988 | Cires et al. | 239/127.3 |
| 4,747,543 | 5/1988 | Madden | 239/127.3 |

*Primary Examiner*—Andres Kashnilow
*Assistant Examiner*—Lesley D. Morris
*Attorney, Agent, or Firm*—Christopher T. Hayes

[57] ABSTRACT

Disclosed is a device for cooling the trailing edge segment of a liner on a convergent flap of a nozzle on a gas turbine engine. The trailing edge cooling device enhances the cooling of the liner without introducing turbulence into the coolant, thereby allowing the coolant to be used to film cool downstream components. In addition, the present invention increases the longitudinal rigidity of the trailing edge of the liner to provide support for the trailing edge without significantly reducing the lateral flexibility of the liner required for thermal expansion.

5 Claims, 2 Drawing Sheets

COOLING SYSTEM FOR THE TRAILING EDGE OF A LINER

The Government has the rights in this invention pursuant to Contract No. F33615-84-C-3015 awarded by the Department of the Air Force.

TECHNICAL FIELD

The present invention relates to cooling a liner which is exposed to hot gas, and particularly to a liner exposed to the exhaust gas produced by a gas turbine engine.

BACKGROUND ART

The use of two-dimensional exhaust nozzles on gas turbine engines is well known in the art. Such exhaust nozzles are described in U.S. Pat. Nos. 4,310,121; 4,690,329; and 4,763,840. The nozzles described in each of these patents is characterized as two-dimensional due to the nozzle having a roughly rectangular exhaust flow path defined by two laterally spaced apart sidewalls and two vertically spaced apart planar nozzle flaps. Due to the intense heat of the engine exhaust gas which contacts the planar nozzle flaps in the convergent section of the nozzle, these convergent flaps must be cooled to prevent life reduction, or failure, of the flap components.

In the past, attempts to cool the convergent flap have included using cooling air supplied to the the convergent flap to provide a combination of impingement cooling and film cooling of the convergent flap liner. In this scheme, the spent cooling air was exhausted through the liner into the exhaust gas flow to provide film cooling of the convergent flap liner, and film cooling of the divergent flap liner downstream. However, at certain engine operating conditions, the static pressure of the cooling air was found to be lower than that of the prevailing static pressure of the exhaust gas, causing aspiration of the hot exhaust gas through the liner and resulting in liner temperatures that exceeded liner material capabilities.

More recently, imperforate liners have evolved which eliminate the film cooling to avoid the aspiration problems of the prior art liners, yet still provide film cooling of the divergent flap liners downstream. These liners typically use a thermal barrier coating on the exhaust gas side or "hot side" of the liner, and rely on impingement cooling of the "cool side" of the liner to provide the required cooling. Although impingement cooling generally provides adequate cooling for most of the liner, under certain conditions the trailing edge segment of the liner may still experience liner temperatures that exceed liner material capabilities. In addition, the high temperatures and pressures of the exhaust gas tend to deflect the liner toward the planar flap to which it is attached, reducing the flow of coolant from the liner.

What is needed is a cooling system for the trailing edge segment which prevents liner temperatures from exceeding liner material capabilities, without significantly disrupting the film cooling of the divergent flap liner downstream.

DISCLOSURE OF INVENTION

It is therefore an object of the present invention to provide a cooling system for the trailing edge liner segment of a planar nozzle flap which prevents temperatures from exceeding liner material capabilities, and which provides the trailing edge with the rigidity necessary to prevent excessive deflection thereof during operation of the gas turbine engine.

According to the present invention, a finned segment is provided which is attached to the liner adjacent the trailing edge thereof and extends along substantially all of the trailing edge. Each fin of this segment has one edge attached to the inner surface of the liner and is oriented so as to be substantially parallel to the flow of exhaust gas along the outer surface of the liner. Each pair of adjacent fins forms a cooling channel therebetween, which channels the coolant to downstream nozzle components to provide film cooling thereof.

Some of the cooling fins are attached to the trailing end of each of the liner retainer ribs so as to be cantilevered therefrom. The cantilevered cooling fins provide longitudinal rigidity to the trailing edge to prevent deflection thereof during engine operation due to the pressure of the exhaust gas. Since the length of each fin is oriented along the length of the liner, the fins stiffen the trailing edge of the liner longitudinally, while the trailing edge remains free to flex laterally in response to varying temperature.

The finned segment of the present invention, extending over that portion of the liner adjacent the trailing edge that is not subject to impingement cooling, provides the extended surface necessary to adequately cool the trailing edge, and the rigidity necessary to prevent deflection thereof. The finned segment augments cooling of the trailing edge of the liner while producing only a minimal pressure drop across the segment, and the fins cause slight, if any, increase in the turbulence of the coolant. Consequently, the present invention provides adequate cooling of the trailing edge without disrupting the film cooling of nozzle components downstream of the liner.

The foregoing and other features and advantages of the present invention will become more apparent from the following description and accompanying drawings.

BEST MODE FOR CARRYING OUT THE INVENTION

Figure 1:
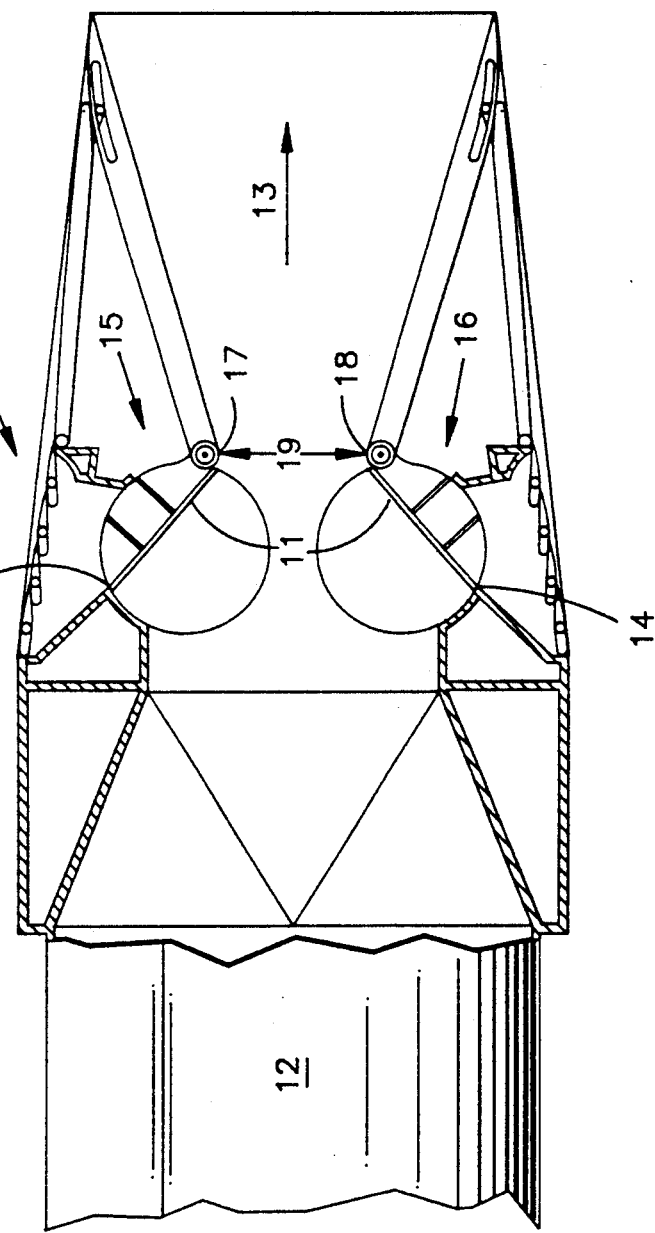
FIG. 1 is a cross-section of a two-dimensional nozzle for a gas turbine engine.

FIG. 1 shows a two-dimensional exhaust nozzle 10 which uses cooled liner assemblies 11 incorporating the present invention. Hot exhaust gas from the gas turbine engine 12 flows axially aftward 13 to the leading edge 14 of the upper 15 and lower 16 convergent flaps. The exhaust gas flows along the convergent flaps 15, 16 to the trailing edges 17, 18 thereof and enters the nozzle throat 19.

Figure 2:
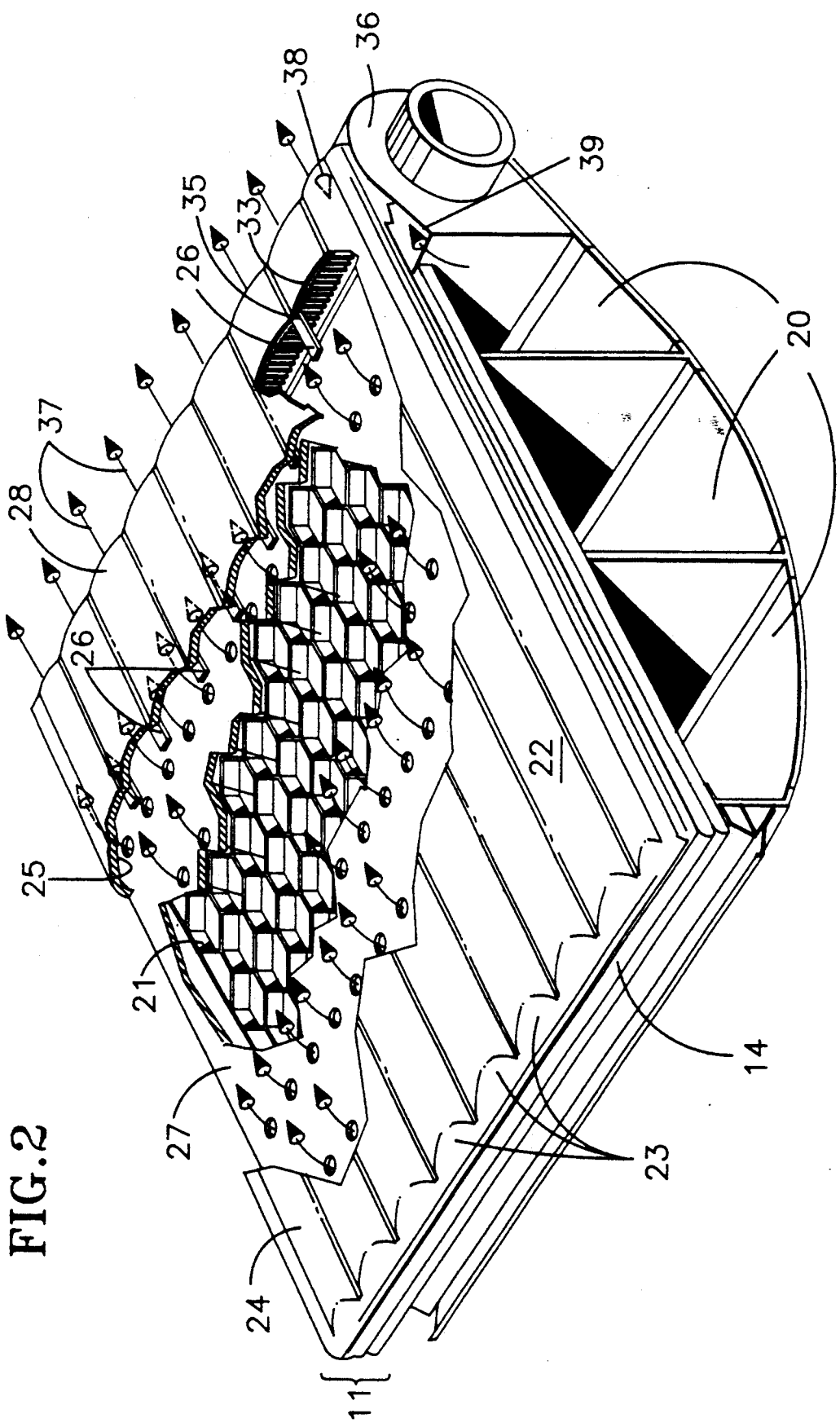
FIG. 2 shows a convergent flap liner with a finned segment of the present invention attached thereto.

Each of the convergent flaps 15, 16 includes a substantially hollow interior section 20 and a panel member 21 as shown in FIG. 2. The panel member 21 is preferably made of perforated honeycomb to permit cooling air from the hollow interior 20 to pass therethrough. To shield the convergent flaps 15, 16 from the intense heat of the exhaust gas, a cooled liner assembly 11, including a liner 22, is secured to the panel member 21 of each convergent flap 15, 16. Although the present invention as disclosed below is shown and described with respect to the lower convergent flap 16, it is to be understood that the liner 22 of the upper convergent flap 15 is identical.

In the preferred embodiment the present invention is secured to a liner 22 which is planular in shape, having a series of longitudinally extending catenary sections 23. The outer surface 24 of the liner 22 may have a thermal barrier coating to reduce the rate of heat transfer from the exhaust gas to the liner 22, thereby reducing the cooling requirements of the liner 22. Secured to the inner surface 25 of the liner 22 between each pair of adjacent catenary sections 23 is a liner retainer rib 26 which secures the liner 22 to the impingement plate 27 and supplements the longitudinal rigidity of the liner 22 liner during exposure to the high temperature exhaust gas. The catenary sections 23 allow the liner assembly 11 to withstand substantial temperature differences between the liner 22 and the supporting structures 21, 27, as those skilled in the art will readily appreciate.

Figure 3:
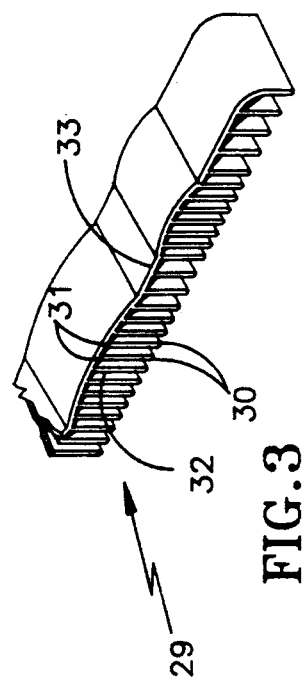
FIG. 3 shows a portion of the finned segment.

Adjacent the trailing edge 28 of the liner 22 is the finned segment 29 of the present invention, which extends along substantially all of the trailing edge 28. A partial cross-section of the finned segment 29 is shown in FIG. 3. Each fin 30 of this segment 29 has one edge 31 attached to the inner surface 25 of the liner 22 and is oriented so as to be substantially parallel to the flow of exhaust gas along the outer surface 24 of the liner 22. Each pair of adjacent fins 30 forms a cooling channel 32 therebetween, the purpose of which is discussed below.

Each of the liner ribs 26 ends at the forward end 33 of the finned segment 29. At least one, and preferably two, cooling fins 30 are attached to the trailing end 35 of each rib 26 so as to be cantilevered therefrom. The cantilevered cooling fins 30 provide longitudinal rigidity to the trailing edge 28 to prevent deflection thereof during engine operation due to the pressure of the exhaust gas.

The finned segment 29 is preferably made of the same material as the liner 22, which may be made of a high temperature alloy such as HAYNES TM 188, a trademark of Cabot Corporation for an alloy containing by weight approximately 41.3% cobalt, 22.0 chromium, 22.0% nickel, 0.1% carbon, 14.5% tungsten, 0.075% lanthanum, and 0.35% silicon. In the preferred embodiment, each fin 30 has a nominal thickness of 0.035 inches (0.9 mm), with the fins 30 nominally spaced at 0.185 inches (4.7 mm) centerline to centerline. Each fin 30 extends from the inner surface 25 of the liner 22 a distance which is slightly less than the distance between the liner inner surface 25 and the convergent-divergent hinge 36 at the respective points along the trailing edge 28 of the liner 22. As those skilled in the art will readily appreciate, the aforementioned dimensions are not critical to the present invention, but merely describe one extended surface configuration which achieves the object of the present invention.

Although in the preferred embodiment the length of the finned segment 29 extends over approximately 10% of the distance from the leading edge 14 of the liner 22 to the trailing edge 28, those skilled in the art will recognize that the actual length of the finned segment 29 is determined by the cooling requirements of that portion of the liner adjacent the trailing edge 28. In general, since the finned segment 29 provides cooling for that portion of the inner surface 25 of the liner 22 which is not exposed to impingement cooling, the finned segment 29 should begin where impingement cooling ends. Although the finned segment 29 can be extended into those areas of the inner surface 25 which are adequately cooled by impingement cooling to increase the liner 22 cooling, the additional weight which results from increasing the length of the finned segment 29 is a design consideration which limits the use of the finned segment 29 in high performance jet engine applications.

The finned segment 29 augments cooling of the trailing edge 28 of the liner 22 resulting in a minimal pressure drop across the segment 29, and the fins 30 cause only a minimal increase in the turbulence of the coolant 37, permitting the spent coolant 37 to be used to provide film cooling of nozzle components downstream of the convergent flap 16. Since the length of each fin 30 is oriented along the length of the catenary sections 23, the fins 30 stiffen the catenary sections 23 of the liner 22 longitudinally, but the catenary sections 23 remain free to flex laterally in response to varying temperature. In addition, the finned segment 29 can be easily fabricated using electric-discharge machining wire-cutting methods that are well known to those skilled in the art.

The trailing edge 28 of the liner 22 and the convergent flap hinge 36 form an exhaust passage 38 into which the fins 30 of the finned segment 29 extend, and through which coolant 37 is dumped into the engine exhaust gas as shown in FIG. 2. During operation of the engine 12, pressurized cooling air is supplied to the interior 20 of the convergent flap 16. The cooling air passes through the panel member 21 of the convergent flap 16, through the impingement plate 27, and impinges the inner surface 25 of the liner 22, producing turbulent heat exchange between the liner 22 and the cooling air. The heated cooling air is then exhausted through the finned segment 29 at the trailing edge 28 of the liner 22 and dumped into the exhaust gas flow at the throat 19 of the nozzle 10, where the static pressure of the exhaust gas is lower than that of the spent coolant 37. In addition to the cooling air which impinges the liner 22, cooling air may be supplied to the trailing edge 28 of the liner 22 through a supplemental cooling slot 39 in the panel member 21 adjacent the hinge 36.

Due to its location, the trailing edge 28 of the liner 22 is not significantly impinged by the cooling air. Furthermore, by the time the cooling air from the liner 22 reaches the trailing edge, the temperature of the cooling air is so hot that, in the absence of an extended heat transfer surface, the trailing edge 28 would not be adequately cooled. The finned segment 29, extending over that portion of the liner 22 adjacent the trailing edge 28 that is not subject to impingement cooling, provides the extended surface necessary to adequately cool the trailing edge 28, while providing the longitudinal rigidity necessary to prevent excessive deflection of the trailing edge 28. In addition, the present invention does not significantly reduce the lateral flexibility of the liner necessary for thermal expansion, and the spent coolant provides adequate film cooling of nozzle components downstream of the trailing edge 28.

Although this invention has been shown and described with respect to detailed embodiments thereof, it will be understood by those skilled in the art that various changes in form and detail thereof may be made without departing from the spirit and scope of the claimed invention.

I claim:

1. A trailing edge cooling device for cooling a trailing edge of a liner on a planar nozzle flap exposed to exhaust gas from a gas turbine engine, the trailing edge secured in spaced relation to a hinge portion of the planar nozzle flap defining an exhaust passage therebetween through which coolant flows into the exhaust gas, said trailing edge cooling device comprising:

a plurality of cooling fins attached to the liner adjacent the trailing edge, each of the fins substantially perpendicular to the planar nozzle flap and extending into the exhaust passage for transferring heat from the liner to the coolant, wherein the liner includes ribs which are secured to the liner parallel to the cooling fins, and at least one of the cooling fins is attached to an end of each rib in cantilevered fashion to support the trailing edge of the liner against the pressure of the exhaust gas.

2. The trailing edge cooling device of claim 1 wherein each of the cooling fins extends from the liner toward the hinge portion defining coolant flow channels between adjacent cooling fins, which coolant flow channels communicate with the exhaust gas.

3. A trailing edge cooling device for cooling a trailing edge of a liner on a planar nozzle flap exposed to exhaust gas from a gas turbine engine, the liner being imperforate and including a plurality of catenary sections to provide for thermal expansion of the liner, said catenary sections oriented substantially perpendicular to the trailing edge, and between adjacent catenary sections a rib is secured thereto to stiffen the liner along the length of the catenary sections, the trailing edge of the liner secured in spaced relation to a hinge portion of the planar nozzle flap defining an exhaust passage therebetween through which coolant flows into the exhaust gas, said trailing edge cooling device comprising:

a plurality of cooling fins attached to the liner adjacent the trailing edge, each of the cooling fins substantially parallel to the catenary sections and extending into the exhaust passage for transferring heat from the liner to the coolant.

4. The trailing edge cooling device of claim 3 wherein at least one of the cooling fins is attached to an end of each rib in cantilevered fashion to support the trailing edge of the liner against the pressure of the exhaust gas.

5. The trailing edge cooling device of claim 4 wherein each of the cooling fins extends from the liner toward the hinge portion defining coolant flow channels between adjacent cooling fins, which coolant flow channels communicate with the exhaust gas.

* * * * *